(12) United States Patent
Flanery

(10) Patent No.: US 6,244,416 B1
(45) Date of Patent: Jun. 12, 2001

(54) FLOW BAY ASSEMBLY

(75) Inventor: Donald G. Flanery, Walkerville, MI (US)

(73) Assignee: United Erectors, Inc., Rockford, MI (US)

( * ) Notice: Subject to any disclaimer, the term of this patent is extended or adjusted under 35 U.S.C. 154(b) by 0 days.

(21) Appl. No.: 09/248,889

(22) Filed: Feb. 11, 1999

Related U.S. Application Data

(60) Provisional application No. 60/077,730, filed on Mar. 12, 1998.

(51) Int. Cl.[7] .......................................................... A47F 7/00
(52) U.S. Cl. ........................................... 193/2 R; 414/276
(58) Field of Search ..................... 193/2 R, 1; 414/276; 211/151; 198/35, 347.4

(56) References Cited

U.S. PATENT DOCUMENTS

| | | |
|---|---|---|
| 3,081,857 | 3/1963 | Krueger . |
| 3,236,550 | 2/1966 | Falkler . |
| 3,592,325 | 7/1971 | Sullivan et al. . |
| 3,592,333 | 7/1971 | Sullivan et al. . |
| 3,690,485 | 9/1972 | Fischer et al. . |
| 3,709,381 | 1/1973 | Sullivan et al. . |
| 3,915,275 | 10/1975 | Specht . |
| 4,036,345 | 7/1977 | Webb . |
| 4,496,037 * | 1/1985 | Spamer ................................ 193/2 R |
| 4,613,270 * | 9/1986 | Konstant et al. ..................... 414/276 |
| 4,969,548 | 11/1990 | Kornylak . |
| 5,215,421 * | 6/1993 | Smith .................................. 414/276 |
| 5,350,048 | 9/1994 | Wylie . |
| 5,390,775 | 2/1995 | Herrick et al. . |
| 5,605,427 * | 2/1997 | Hammond ............................ 414/276 |

* cited by examiner

Primary Examiner—Joseph E. Valenza
Assistant Examiner—Rashmi Sharma
(74) Attorney, Agent, or Firm—Van Dyke, Gardner, Linn & Burkhart, LLP

(57) ABSTRACT

A flow bay assembly includes a plurality of laterally spaced apart deck modules which may be longitudinally elongated. A plurality of flow rails are provided, each between a pair of deck modules. A plurality of connecting members connect adjacent deck modules and support the flow rails.

17 Claims, 4 Drawing Sheets

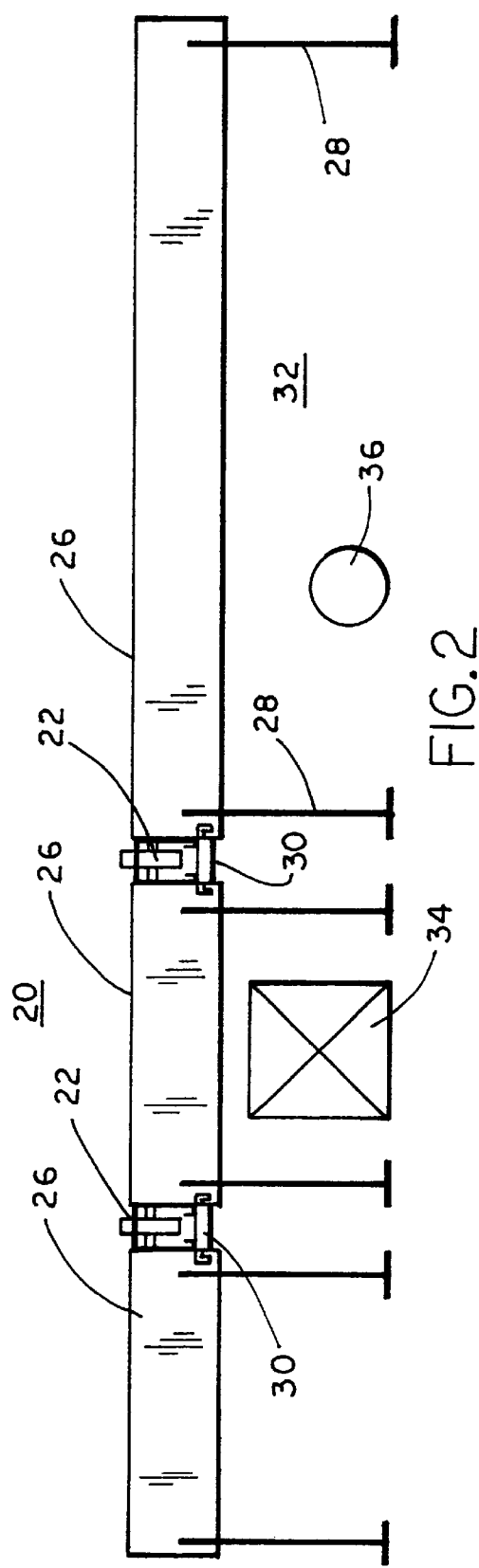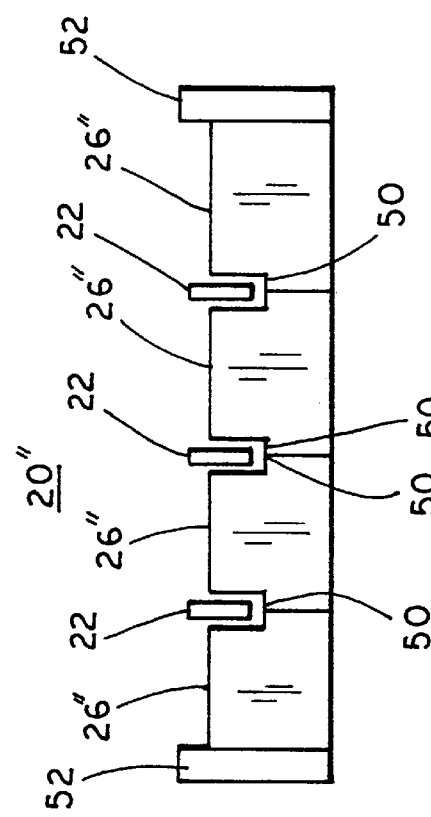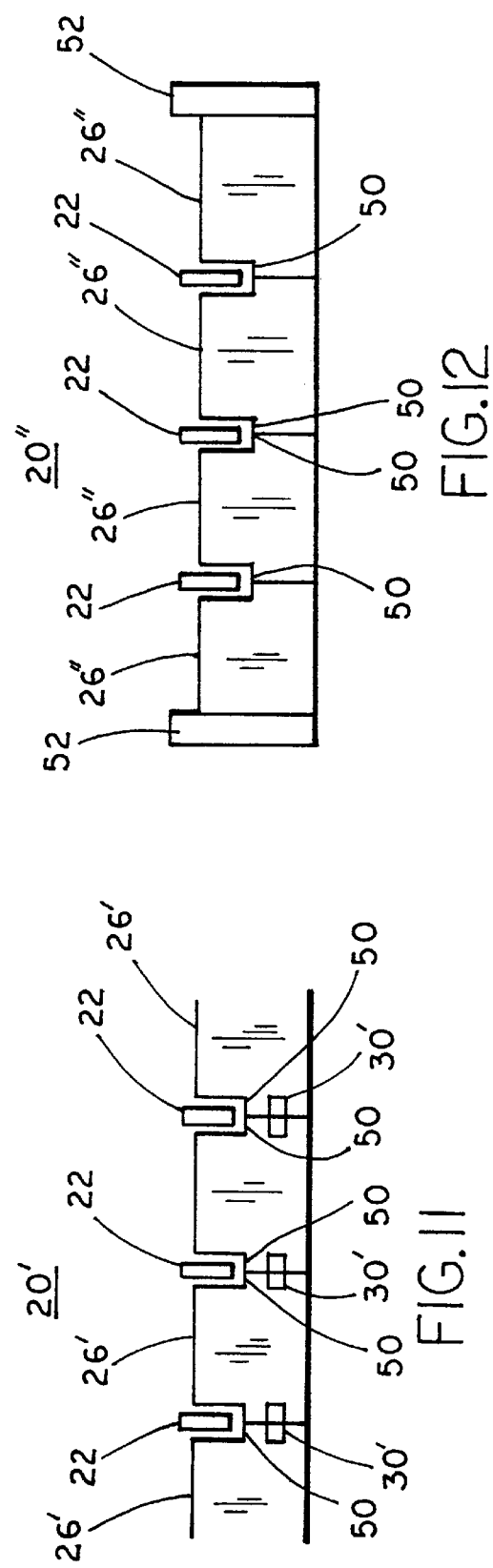

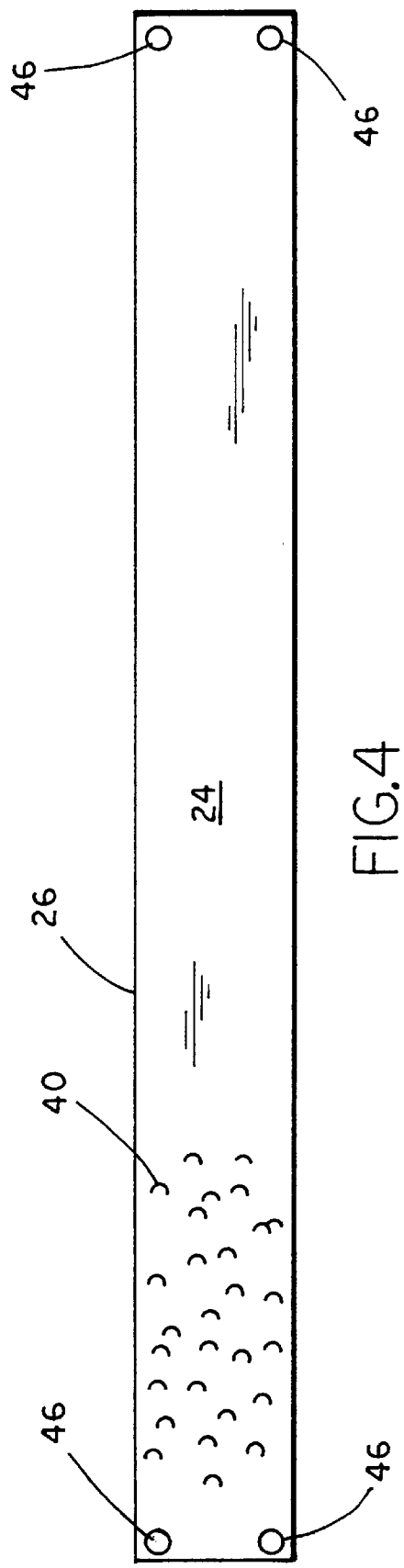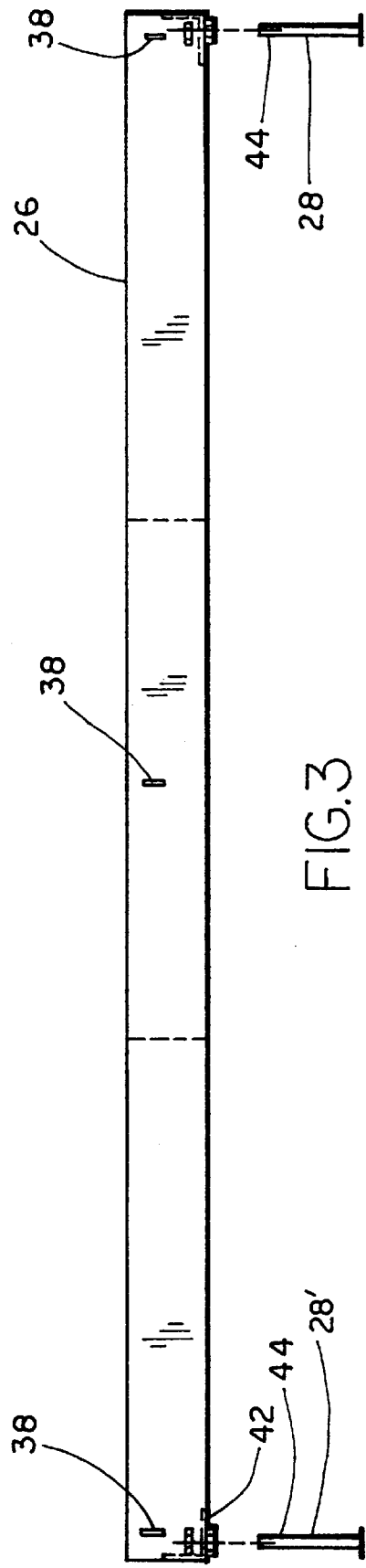

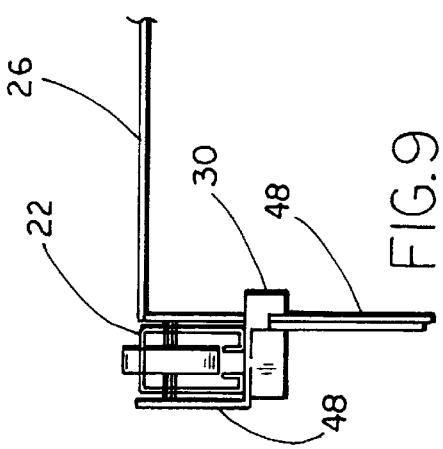
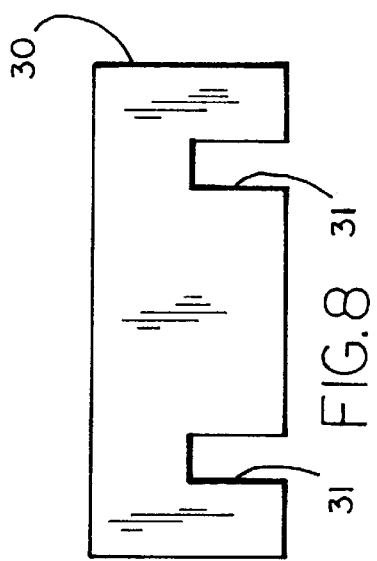
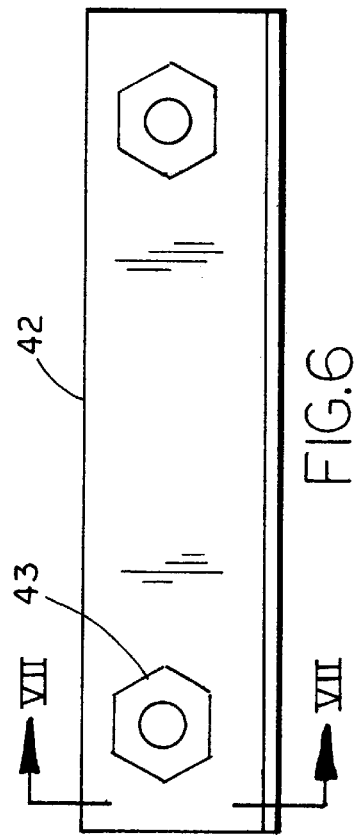
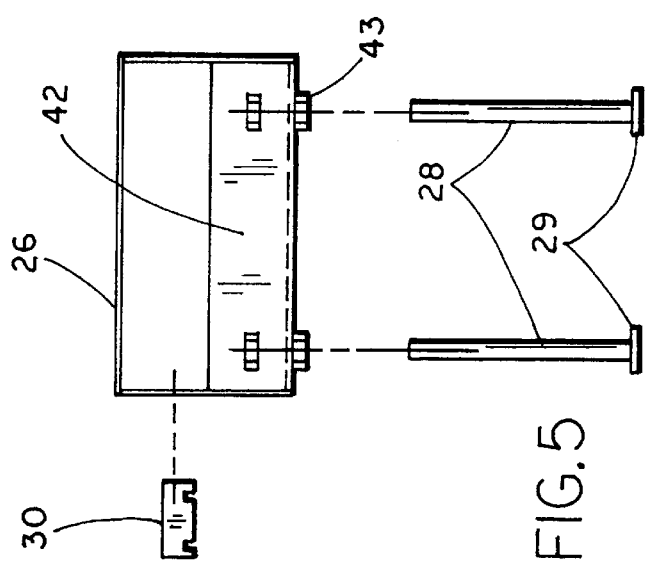
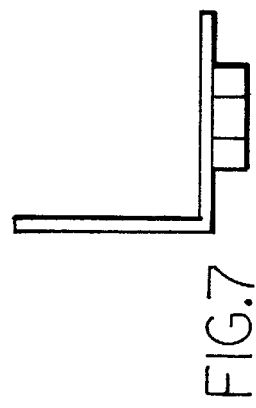

FLOW BAY ASSEMBLY

REFERENCE TO RELATED APPLICATION

This non-provisional application is based upon U.S. provisional patent application Serial No. 60/077,730, filed Mar. 12, 1998, and claims its priority date from that application, which is hereby incorporated herein by reference.

BACKGROUND OF THE INVENTION

This invention relates generally to material handling systems and, more particularly, to gravity conveying systems, namely flow bays.

A flow bay is an area filled with a series of parallel gravity conveying rails, known as flow rails, which are spaced apart and usually arranged in lanes. The lanes may be fed from a perpendicular feed conveyor and typically terminate in a loading dock or other destination point. In this manner, boxed or crated goods, typically relatively large in size, such as appliances, furniture, cabinets, and the like, can be manually transported down one of the lanes of the flow bay by a slight manual push.

Conventionally, such flow bays have been manufactured by erecting a series of lateral support beams on the subsurface and attaching the flow rails to the support beams such as by clamping or welding. The area between the flow rails is typically provided with a walking surface made up of plywood sheets which is also supported by the cross members.

The difficulty with the known flow bay construction technique is primarily that it is extremely labor-intensive to erect. Often, it is necessary to replace a previous flow bay during a plant shutdown period, which may be a relatively short period, such as three or four days. This is necessary in order to have the flow bay operational again after the shutdown. Because of the labor intensity in erecting the prior known flow bays, it has been extremely difficult to erect an entire flow bay in a relatively short period of time. Additionally, the support surfaces of such prior flow bays, while accommodating the movement of persons on the plywood support surfaces, were not necessarily safe. When a fluid is spilled on such surface, it could result in the surface becoming slippery, thus possibly contributing to a fall. Furthermore, the human support surface was significantly below the flow rails which made lateral movement along the flow bay difficult at best.

SUMMARY OF THE INVENTION

The present invention provides a flow bay assembly which is exceptionally easy to erect thereby allowing an entire flow bay area to be installed in a relatively short period of time. Furthermore, a flow bay assembly, according to the invention, is exceptionally functional in operation, especially in providing safe movement of persons in the area.

A flow bay assembly, according to an aspect of the invention, includes a plurality of spaced apart deck modules and a plurality of flow rails. Each of the flow rails is between a pair of deck modules. A plurality of connecting members connect adjacent deck modules and support the flow rails.

According to another aspect of the invention, a plurality of elongated deck modules are laterally positioned and configured to define flow rail supporting surfaces between adjacent deck modules. Adjacent deck modules may be interconnected by slip-lock fasteners which assemble adjacent modules without the necessity for tools.

A flow bay assembly, according to the invention, can be interconnected without the necessity for bolting or welding of members together. The deck modules may be configured to be adjustable to a proper orientation from above the deck surface thereby further facilitating ease of assembly. The deck modules are preferably made from steel and provided with an anti-skid upper surface to thereby promote safety in operation. Furthermore, the components making up the flow bay assembly may be manufactured off-site thereby reducing labor costs and further facilitating ease of assembly on the job site.

These and other objects, advantages and features of this invention will become apparent upon review of the following specification in conjunction with the drawings.

BRIEF DESCRIPTION OF THE DRAWINGS

FIG. 2 is a sectional view taken along the lines II—II in FIG. 1;

FIG. 3 is a side elevation of a deck module;

FIG. 4 is a top plan view of the deck module in FIG. 3;

FIG. 5 is an exploded end elevation of a deck module and connecting member;

FIG. 6 is a top plan view of a portion of the leveling assembly;

FIG. 7 is a sectional view taken along the lines VII—VII in FIG. 6;

FIG. 8 is a connecting key, according to the invention;

FIG. 9 is an end elevation of an end deck module;

FIG. 10 is a bracket useful in FIG. 9;

FIG. 11 is an alternative embodiment of a flow bay assembly, according to the invention; and FIG. 12 is another alternative embodiment of a flow bay assembly, according to the invention.

DESCRIPTION OF THE PREFERRED EMBODIMENT

Figure 1:
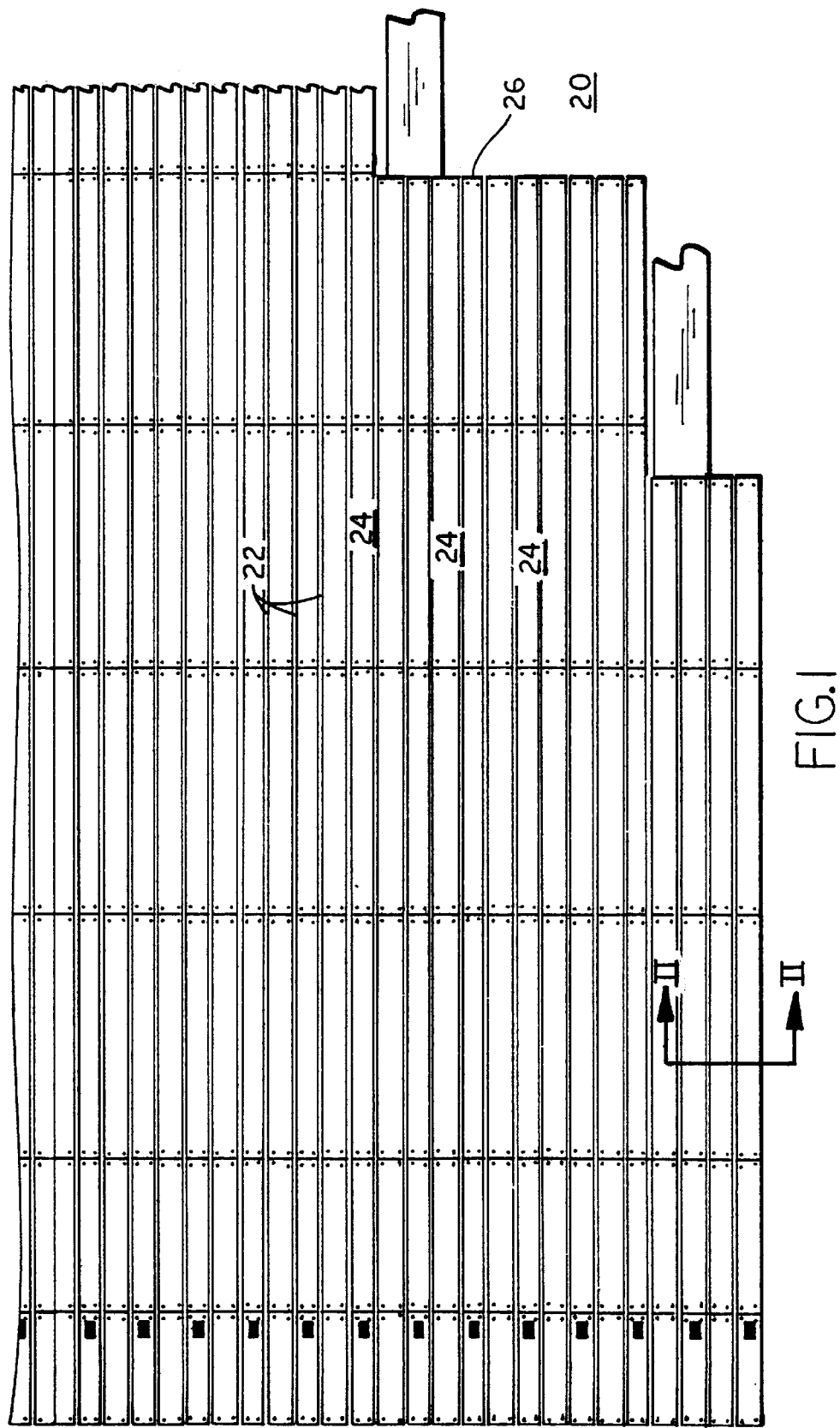
FIG. 1 is a top plan view of a flow bay assembly, according to the invention.

Referring now specifically to the drawings, and the illustrative embodiments depicted therein, a flow bay assembly 20 is made up of a plurality of flow lines designated in FIG. 1 by numbers 47, 48, 49 . . . , each of which is made up of a pair of flow rails 22 separated by a deck 24. Deck 24 is established by a series of deck modules 26. As is understood by the skilled artisan, a flow bay typically has a slight grade from right to left or left to right, as illustrated in FIG. 1, whereby an article can be easily moved along a pair of flow rails by manual force. The deck 24 provides a surface for walking about the flow bay.

Each deck module 26 is generally channel-shaped in a lateral cross section, such as illustrated in FIG. 2, and preferably elongated in a longitudinal direction, as best illustrated in FIG. 1. Each deck module 26 has typically four leveling legs 28 which support the respective deck module with feet 29 which engage a subjacent surface (not shown). Connecting members, such as keys 30, interconnect adjacent deck modules in order to provide stability to the flow bay assembly. Advantageously, keys 30 additionally vertically support flow rails 22. In this manner, the flow bay assembly may be readily assembled without the necessity for bolting or welding of the various members. In the embodiment illustrated in FIG. 2, the leveling legs 28 are extended in order to provide a space 32 under the deck modules in order to allow running of a heat duct 34, electrical conduit 36, and other utilities. Alternatively, leveling legs 28 could be significantly shorter thereby placing the deck modules closer to the support surface below.

As illustrated in FIG. 3, each deck module 26 includes a plurality of slots 38 which accommodate keys 30. The portion of deck 24 defined by each module is preferably provided with a series of surface features 40 configured to provide an anti-skid characteristic to the deck. Each deck module additionally includes a nut plate 42 including a pair of nuts 43 which threadably receives leveling legs 28, as illustrated in FIG. 3. Each leveling leg 28 has an upper end 44 which is configured to receive a tool. In the illustrated embodiment, upper end 44 is slotted in order to receive a screwdriver. Alternatively, it could be hex-shaped to receive a socket wrench or other configuration which would be apparent to the skilled artisan. A through-opening 46 is provided in deck 24 above each leveling leg 28. This allows the leveling legs to be adjusted from above the deck 24. This feature allows all of the deck modules to be assembled and subsequently leveled because access under the modules is not required.

When a flow rail 22 must be supported at an end of deck module 26 that does not have an adjacent deck module, an offset support bracket 48 is positioned in slot 38 along with key 30 in order to provide support for the flow rail 22, as illustrated in FIGS. 9 and 10. Flow rail 22, in the illustrated embodiment, is a single-wheel gravity conveyor with 2-inch diameter wheels on either 3-inch or 4-inch centers of the type marketed by Mannesmann Dematic Rapistan Corp. of Grand Rapids, Mich. under Model No. FTH 30-2.

The present invention provides a flow bay assembly which is exceptionally functional. The flow bay assembly can be manufactured in a factory away from the job site and easily assembled on the job site. This is facilitated by the deck modules being readily interconnectable without the necessity for bolting or welding. The deck modules can advantageously be leveled from above the deck surface. The modules are preferably manufactured preferably from steel and imparted with an anti-skid surface. This provides a strong and safe assembly. Furthermore, the flow bay assembly can be readily knocked down which allows the components to be reused in a different location.

In an alternative embodiment, illustrated in FIG. 11, each deck module 26' has a laterally outward ledge 50 defined therein. When the modules are interconnected by a key 30', the ledges 50 provide support for the flow rails 22. In another alternative embodiment illustrated in FIG. 12, a flow bay 20" is made up of a plurality of deck modules 26" which are not individually interconnected by connecting members. Rather, lateral supports 52 maintain the deck members together and the flow rails 22 are supported by channels 50. Other embodiments will suggest themselves to those of ordinary skill in the art.

Changes and modifications in the specifically described embodiments can be carried out without departing from the principles of the invention, which is intended to be limited only by the scope of the appended claims, as interpreted according to the principles of patent law.

The embodiments of the invention in which an exclusive property or privilege is claimed are defined as follows:

1. A flow bay assembly, comprising:
   a plurality of laterally spaced apart deck modules;
   a plurality of flow rails, each between a pair of deck modules; and
   a plurality of members connecting adjacent deck modules and supporting said flow rails.

2. The flow bay assembly in claim 1 wherein said deck modules are self-supporting on a subjacent surface.

3. The flow bay assembly in claim 2 including leveling feet for supporting each of said deck modules on the subjacent surface.

4. The flow bay assembly in claim 3 wherein said leveling feet are adjustable from above said deck modules.

5. The flow bay assembly in claim 4 wherein said leveling feet protrude into said deck modules and including openings defined in a top surface of said deck modules aligned with said leveling feet in order to provide access to said leveling feet for adjustment.

6. The flow bay assembly in claim 1 wherein said members are configured to be joined with deck modules without the use of tools.

7. The flow bay assembly in claim 6 wherein said members have downwardly projecting slots which engage openings in sides of said deck modules.

8. The flow bay assembly in claim 1 wherein said deck modules are elongated longitudinally.

9. The flow bay assembly in claim 1 wherein said deck modules have an anti-skid upper surface.

10. The flow bay assembly in claim 1 wherein said deck modules are made from steel.

11. The flow bay assembly in claim 1 wherein said deck modules are channel shaped.

12. A flow bay assembly, comprising:
    a plurality of longitudinally elongated deck modules which are laterally positioned;
    said deck modules maintained in close positioning defining a support surface; and
    a flow rail supported on said support surface.

13. The flow bay assembly in claim 12 wherein said deck modules are maintained in close positioning by connecting members.

14. The flow bay assembly in claim 13 wherein said connecting members define said support surface.

15. The flow bay assembly in claim 12 wherein said deck modules define channels at lateral edges thereof, said channels defining said support surface.

16. The flow bay assembly in claim 15 wherein said deck modules are joined by connecting members.

17. The flow bay assembly in claim 15 wherein said deck modules are restrained by outward lateral supports.

* * * * *